(12) United States Patent
Kobayashi et al.

(10) Patent No.: US 8,847,108 B2
(45) Date of Patent: Sep. 30, 2014

(54) LASER BEAM MACHINING APPARATUS WITH DETECTION LASER BEAM OSCILLATOR

(75) Inventors: Satoshi Kobayashi, Ota-ku (JP); Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 1292 days.

(21) Appl. No.: 12/430,522

(22) Filed: Apr. 27, 2009

(65) Prior Publication Data

US 2009/0277889 A1    Nov. 12, 2009

(30) Foreign Application Priority Data

May 9, 2008 (JP) ................................. 2008-123382

(51) Int. Cl.
| | |
|---|---|
| *B23K 26/00* | (2014.01) |
| *B23K 26/067* | (2006.01) |
| *B23K 26/04* | (2014.01) |
| *B23K 26/40* | (2014.01) |
| *B28D 5/04* | (2006.01) |

(52) U.S. Cl.
CPC ........... *B23K 26/046* (2013.01); *B23K 26/0057* (2013.01); *B23K 26/4075* (2013.01); *B28D 5/04* (2013.01)
USPC ................................ 219/121.67; 219/121.68

(58) Field of Classification Search
USPC ............. 219/121.61, 121.62, 121.67, 121.68, 219/121.76; 438/463; 356/241.1
See application file for complete search history.

(56) References Cited

U.S. PATENT DOCUMENTS

| | | | |
|---|---|---|---|
| 2007/0202619 A1* | 8/2007 | Tamura et al. | 438/22 |
| 2007/0235418 A1* | 10/2007 | Park et al. | 219/121.6 |
| 2008/0055588 A1* | 3/2008 | Nomaru et al. | 356/73 |

FOREIGN PATENT DOCUMENTS

| | | |
|---|---|---|
| JP | B2 3408805 | 3/2003 |
| JP | A 2008-12566 | 1/2008 |

* cited by examiner

*Primary Examiner* — Brian Jennison
(74) *Attorney, Agent, or Firm* — Greer Burns & Crain, Ltd

(57) ABSTRACT

A laser beam machining apparatus includes a height position detecting unit configured to detect the height position of an upper surface of a workpiece to be machined which is held on a chuck table, and a controller configured to control a condensing point position adjusting unit on the basis of a detection signal from the height position detecting unit. The height position detecting unit includes a detection laser beam oscillating unit configured to oscillate a detection laser beam having a wavelength different from the wavelength of the machining laser beam, and a reflected beam analyzing unit which analyzes a reflected beam generated upon reflection of the detection laser beam on the upper surface of the workpiece and which sends an analytical results to the controller. The laser beam machining apparatus further includes a condensing point position displacing unit configured to displace the condensing point position of the detection laser beam and the condensing point position of the machining laser beam.

9 Claims, 14 Drawing Sheets

LASER BEAM MACHINING APPARATUS WITH DETECTION LASER BEAM OSCILLATOR

BACKGROUND OF THE INVENTION

1. Field of the Invention

The present invention relates to a laser beam machining apparatus for laser beam machining of a plate-shaped workpiece to be machined which is held on a chuck table, along predetermined planned machining lines.

2. Description of the Related Art

In the semiconductor device manufacturing process, usually, a plurality of regions are demarcated by planned dividing lines called streets arranged in a grid pattern in a surface of a substantially circular disk-shaped semiconductor wafer, and devices such as ICs and LSIs are formed in the thus demarcated regions. Then, the semiconductor wafer is cut along the streets to divide the regions provided with the circuits from each other, thereby manufacturing the individual semiconductor chips. Similarly, an optical device wafer in which a gallium nitride compound semiconductor and the like are laminated on a surface of a sapphire substrate is also cut along streets, to be divided into individual optical devices such as photo-diodes and laser diodes, which are widely utilized for electric apparatuses.

In recent years, as a method for dividing a plate-like workpiece such as a semiconductor wafer, a laser beam machining method has been attempted in which a pulsed laser beam capable of being transmitted through the workpiece is used, and irradiation with the pulsed laser beam is conducted by adjusting the beam condensing point in the inside of the regions to be divided. In a dividing method based on the use of this laser beam machining method, a workpiece is irradiated from one side thereof with a pulsed laser beam having such a wavelength (e.g., 1064 nm) as to be transmitted through the workpiece while adjusting the condensing point to the inside of the workpiece, so as to continuously form a denatured layer in the inside of the workpiece along the streets, and an external force is exerted along the streets where strength is lowered due to the formation of the denatured layer, thereby dividing the workpiece (refer to, for example, Japanese Patent No. 3408805).

However, when the plate-shaped workpiece such as a semiconductor wafer has waviness (undulation) and it shows dispersion in thickness, formation of the denatured layer uniformly at a predetermined depth may become impossible to achieve, due to a problem related to refractive index involved in irradiation with the laser beam. In order to form the denatured layer uniformly at a predetermined depth in the inside of the semiconductor wafer or the like, therefore, it is necessary to preliminarily detect the ruggedness in the regions to be irradiated with the laser beam and perform the machining while controlling the laser beam irradiation means to follow up to the rugged form.

In order to solve the above-mentioned problem, there has been proposed a laser beam machining apparatus including a chuck table having a workpiece holding surface for holding a workpiece to be machined, machining laser beam oscillating means for oscillating a machining laser beam for laser beam machining of the workpiece held on the chuck table, a condenser having a condenser lens for condensing the machining laser beam oscillated by the machining laser beam oscillating means, condensing point position adjusting means for moving the condensing point of the machining laser beam condensed by the condenser lens of the condenser in a direction perpendicular to the workpiece holding surface, height position detecting means for detecting the height position of the workpiece held on the chuck table, and control means for controlling the condensing point position adjusting means on the basis of a signal indicative of the height position detected by the height position detecting means (refer to, for example, Japanese Patent Laid-open No. 2008-12566).

The height position detecting means in the laser beam machining apparatus disclosed in Japanese Patent Laid-open No. 2008-12566 has a configuration in which the surface of the workpiece held on the chuck table is irradiated with a detection laser beam through the condenser lens, and the height position of the workpiece held on the chuck table is detected based on the area of a reflected beam reflected from the surface.

However, the height position detecting means disclosed in the unexamined patent publication has the problem that, since the condensing point of the detection laser beam and the condensing point of the machining laser beam coincide with each other, the area of the spot of the detection laser beam radiated onto the surface of the workpiece is very large when the workpiece held on the chuck table is machined by positioning the condensing point of the machining laser beam into a deep position from the surface of the workpiece. As a result, the quantity of light per unit area, of the reflected beam, is reduced, making it impossible to accurately detect the height position of the workpiece held on the chuck table. Therefore, there is the problem that a workpiece having a wavy (undulated) surface cannot be machined accurately at a predetermined position of depth from the surface thereof in the manner of following up to the wavy (undulated) form of the surface.

SUMMARY OF THE INVENTION

Accordingly, it is an object of the present invention to provide a laser beam machining apparatus by which a workpiece to be machined can be machined accurately at a predetermined position of depth from the surface of the workpiece even when the workpiece shows dispersion in thickness.

In accordance with an aspect of the present invention, there is provided a laser beam machining apparatus including: a chuck table having a workpiece holding surface for holding a workpiece to be machined; machining laser beam oscillating means for oscillating a machining pulsed laser beam for machining the workpiece held on the chuck table; a condenser for condensing the machining pulsed laser beam oscillated by the machining laser beam oscillating means; condensing point position adjusting means for displacing a condensing point position of the machining pulsed laser beam condensed by the condenser; height position detecting means for detecting the height position of an upper surface of the workpiece held on the chuck table; and control means for controlling the condensing point position adjusting means on the basis of a detection signal from the height position detecting means; wherein the height position detecting means includes detection laser beam oscillating means for oscillating a detection laser beam different in wavelength from the machining pulsed laser beam, a detection laser beam irradiation path for guiding the detection laser beam oscillated by the detection laser beam oscillating means to the condenser, a detection laser beam reflection path for guiding a reflected beam generated upon reflection by the workpiece held on the chuck table of a laser beam radiated through the detection laser beam irradiation path and the condenser, reflected beam analyzing means which is disposed in the detection laser beam reflection path so as to analyze the reflected beam reflected on the upper surface of the workpiece and which sends a analytical result to the control means, and condensing point position displacing means for displacing the condensing point position of the detection laser beam and the condensing point position of the machining pulsed laser beam.

Preferably, the condensing point position displacing means includes a pair of convex lenses, and spacing adjusting means for adjusting the spacing between the pair of convex lenses, and is disposed in either one of the irradiation path of the detection laser beam and an irradiation path of the machining pulsed laser beam. The condensing point position displacing means, preferably, is disposed in the irradiation path of the detection laser beam.

In addition, preferably, the condenser lens includes a plurality of chromatic aberration lenses for changing the condensing point position of the machining pulsed laser beam and the condensing point position of the detection laser beam, and the condensing point position displacing means includes lens positioning means for positioning each of the plurality of chromatic aberration lenses on an optical path of the machining pulsed laser beam and an optical path of the detection laser beam.

Besides, preferably, the machining laser beam oscillating means oscillates a machining laser beam which has such a wavelength as to be transmitted through the workpiece to be machined, and the detection laser beam oscillating means oscillates a detection laser beam which has such a wavelength as to be reflected by the workpiece.

In the laser beam machining apparatus according to the present invention, the condensing point position displacing means for displacing the condensing point position of the detection laser beam and the condensing point position of the machining laser beam is provided. Therefore, with the condensing point position of the detection laser beam set on the upstream side in the laser beam radiating direction as compared with the condensing point position of the machining laser beam, the spot of the detection laser beam radiated onto the upper surface of the workpiece held on the chuck table can be made remarkably smaller than the corresponding spot in the case where the condensing point position of the detection laser beam coincides with the condensing point position of the machining pulsed laser beam. Therefore, the quantity of light per unit area of the reflected beam of the detection laser beam becomes large, so that the height position of the workpiece held on the chuck table which is determined by the reflected beam analyzing means on the basis of the quantity of light of the reflected beam becomes accurate. Accordingly, a workpiece can be machined accurately at a predetermined position of depth from its upper surface even when the workpiece shows dispersion in thickness.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
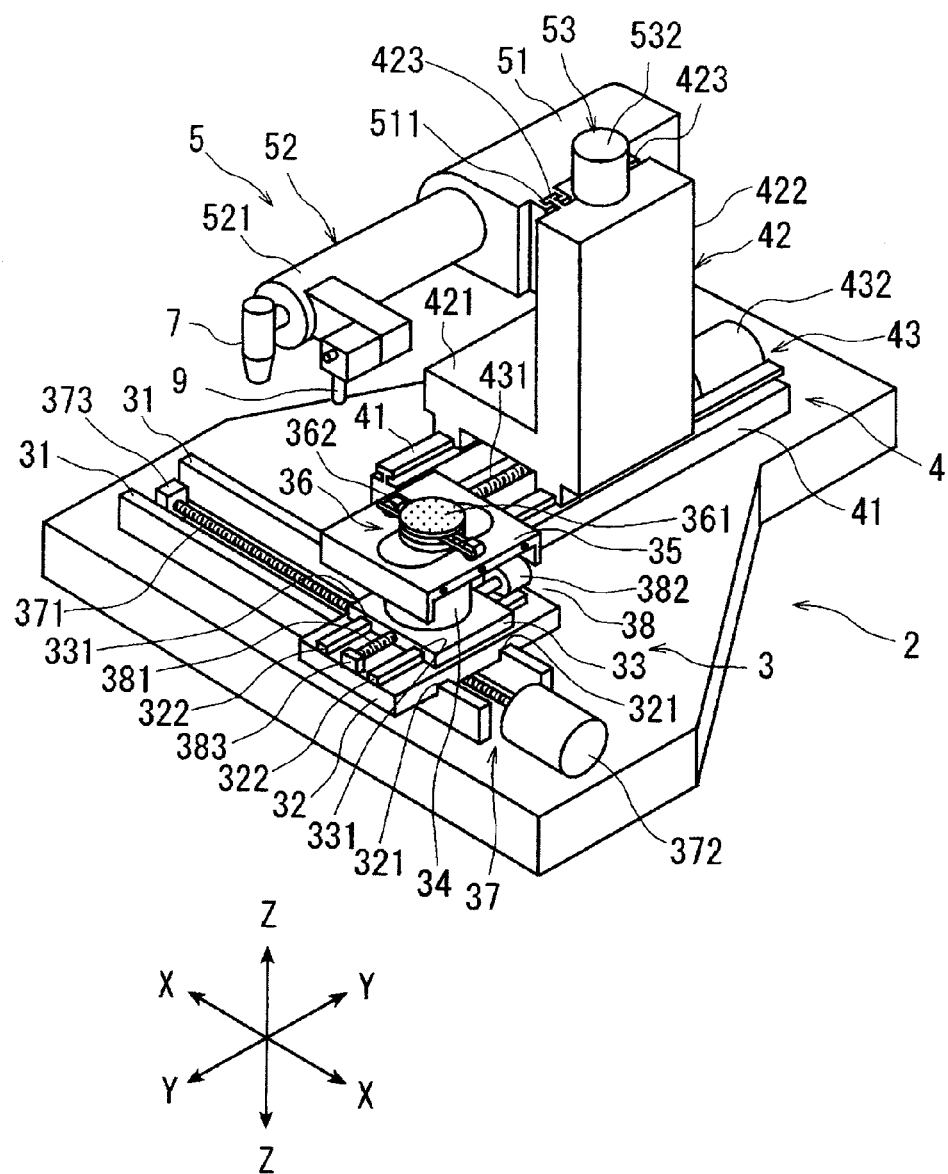
FIG. 1 is a perspective view of a laser beam machining apparatus configured according to the present invention.

Now, some preferred embodiments of the laser beam machining apparatus configured according to the present invention will be described in detail below, referring to the attached drawings. FIG. 1 shows a perspective view of a laser beam machining apparatus configured according to the present invention. The laser beam machining apparatus shown in FIG. 1 includes a stationary base 2, a chuck table mechanism 3 which is disposed on the stationary base 2 so as to be movable in a machining feed direction indicated by arrow X and which holds a workpiece to be machined, a laser beam irradiation unit support mechanism 4 disposed on the stationary base 2 so as to be movable in an indexing feed direction (Y-axis direction) indicated by arrow Y perpendicular to the direction (X-axis direction) indicated by arrow X, and a laser beam irradiation unit 5 disposed on the laser beam irradiation unit support mechanism 4 so as to be movable in a direction (Z-axis direction) indicated by arrow Z.

The chuck table mechanism 3 includes a pair of guide rails 31, 31 disposed on the stationary base 2 in parallel to each other along the machining feed direction indicated by arrow X, a first sliding block 32 disposed on the guide rails 31, 31 so as to be movable in the machining feed direction (X-axis direction) indicated by arrow X, a second sliding block 33 disposed on the first sliding block 32 so as to be movable in the indexing feed direction (Y-axis direction) indicated by arrow Y, a cover table 35 supported on the second sliding block 33 by a hollow cylindrical member 34, and a chuck table 36 as workpiece holding means. The chuck table 36 has a suction chuck 361 formed from a porous material, and a workpiece to be machined, for example, a disk-shaped semiconductor wafer is supported on the suction chuck 361 serving as a workpiece holding surface by suction means (not shown). The chuck table 36 configured in this manner is rotated by a pulse motor (not shown) disposed in the hollow cylindrical member 34. Incidentally, the chuck table 36 is equipped with clamps 362 for fixing an annular frame to be described later.

The first sliding block 32 is provided in its lower surface with a pair of guided grooves 321, 321 in which the pair of guide rails 31, 31 are fitted, and is provided on its upper surface with a pair of guide rails 322, 322 formed in parallel to each other along the indexing feed direction indicated by arrow Y. The first sliding block 32 configured in this manner, with its guided grooves 321, 321 fitted over the pair of guide rails 31, 31, is movable along the pair of guide rails 31, 31 in the machining feed direction indicated by arrow X. The chuck mechanism table 3 is provided with machining feeding means 37 by which the first sliding block 32 is moved along the pair of guide rails 31, 31 in the machining feed direction indicated by arrow X.

The machining feeding means 37 includes a male screw rod 371 disposed between and in parallel to the pair of guide rails 31 and 31, and a drive source such as a pulse motor 372 for rotationally driving the male screw rod 371. The male screw rod 371 is rotatably supported at its one end by a bearing block 373 fixed to the stationary base 2, and is connected at its other end to an output shaft of the pulse motor 372 in a power transmitting manner. Incidentally, the male screw rod 371 is screw engaged with a penetrating female screw hole formed in a female screw block (not shown) projectingly provided on a lower surface of a central part of the first sliding block 32. Therefore, with the male screw rod 371 driven by the pulse motor 372 to rotate normally and reversely, the first sliding block 32 is moved along the guide rails 31, 31 in the machining feed direction (X-axis direction) indicated by arrow X.

The second sliding block 33 is provided in its lower surface with a pair of guided grooves 331, 331 in which the pair of guide rails 322, 322 provided on the upper surface of the first sliding block 32 are fitted, and is movable in the indexing feed direction (Y-axis direction) indicated by arrow Y, with its guided grooves 331, 331 fitted over the pair of guide rails 322, 322. The chuck mechanism table 3 is provided with first indexing feeding means 38 by which the second sliding block 33 is moved in the indexing feed direction (Y-axis direction) indicated by arrow Y along the pair of guide rails 322, 322 provided on the first sliding block 32. The first indexing feeding means 38 includes a male screw rod 381 disposed between and in parallel to the pair of guide rails 322 and 322, and a drive source such as a pulse motor 382 for rotationally driving the male screw rod 381.

The male screw rod 381 is rotatably supported at its one end by a bearing block 383 fixed to an upper surface of the first sliding block 32, and is connected at its other end to an output shaft of the pulse motor 382 in a power transmitting manner. Incidentally, the male screw rod 381 is screw engaged with a penetrating female screw hole formed in a female screw block (not shown) projectingly provided on a lower surface of a central part of the second sliding block 33. Therefore, with the male screw rod 381 driven by the pulse motor 382 to rotate normally and reversely, the second sliding block 33 is moved along the guide rails 322, 322 in the indexing feed direction (Y-axis direction) indicated by arrow Y.

The laser beam irradiation unit support mechanism 4 has a pair of guide rails 41, 41 on the stationary base 2 in parallel to each other along the indexing feed direction (Y-axis direction) indicated by arrow Y, and a movable support base 42 disposed on the guide rails 41, 41 so as to be movable in the direction indicated by arrow Y. The movable support base 42 includes a moving support part 421 movably disposed on the guide rails 41, 41, and a mounting part 422 mounted to the moving support part 421. On one side surface of the mounting part 422, a pair of guide rails 423, 423 extending in a direction indicated by arrow Z are provided in parallel to each other. The laser beam irradiation unit support mechanism 4 is provided with second indexing feeding means 43 by which the movable support base 42 is moved along the pair of guide rails 41, 41 in the indexing feed direction (Y-axis direction) indicated by arrow Y. The second indexing feeding means 43 includes a male screw rod 431 disposed between and in parallel to the pair of guide rails 41 and 41, and a drive source such as a pulse motor 432 for rotationally driving the male screw rod 431.

The male screw rod 431 is rotatably supported at its one end on a bearing block (not shown) fixed to the stationary base 2, and is connected at its other end to an output shaft of the pulse motor 432 in a power transmitting manner. Incidentally, the male screw rod 431 is screw engaged with a female screw hole formed in a female screw block (not shown) projectingly provided on a lower surface of a central part of the moving support part 421 constituting the movable support base 42. Therefore, with the male screw rod 431 driven by the pulse motor 432 to rotate normally and reversely, the movable support base 42 is moved along the guide rails 41, 41 in the indexing feed direction (Y-axis direction) indicated by arrow Y.

The laser beam irradiation unit 5 includes a unit holder 51, and laser beam irradiation means 52 attached to the unit holder 51. The unit holder 51 is provided with a pair of guided grooves 511, 511 in which the pair of guide rails 423, 423 provided on the mounting part 422 are slidably fitted, and is supported so as to be movable in the direction (Z-axis direction) indicated by arrow Z, with its guided grooves 511, 511 fitted over the guide rails 423, 423.

The laser beam irradiation unit 5 has first condensing point position adjusting means 53 for moving the unit holder 51 along the pair of guide rails 423, 423 in a focal point position adjusting direction (Z-axis direction) indicated by arrow Z, which is a direction perpendicular to the workpiece holding surface of the chuck table 36. The first condensing point position adjusting means 53 includes a male screw rod (not shown) disposed between the pair of guide rails 423 and 423, and a drive source such as a pulse motor 532 for rotationally driving the male screw rod. With the male screw rod (not shown) driven by the pulse motor 532 to rotate normally and reversely, the unit holder 51 and the laser beam irradiation means 52 are moved along the guide rails 423, 423 in the condensing point position adjusting direction (Z-axis direction) indicated by arrow Z. Incidentally, in the embodiment shown in the figure, the laser beam irradiation means 52 is moved upward by normal rotational driving of the pulse motor 532, and the laser beam irradiation means 52 is moved downward by reverse rotational driving of the pulse motor 532.

Figure 2:
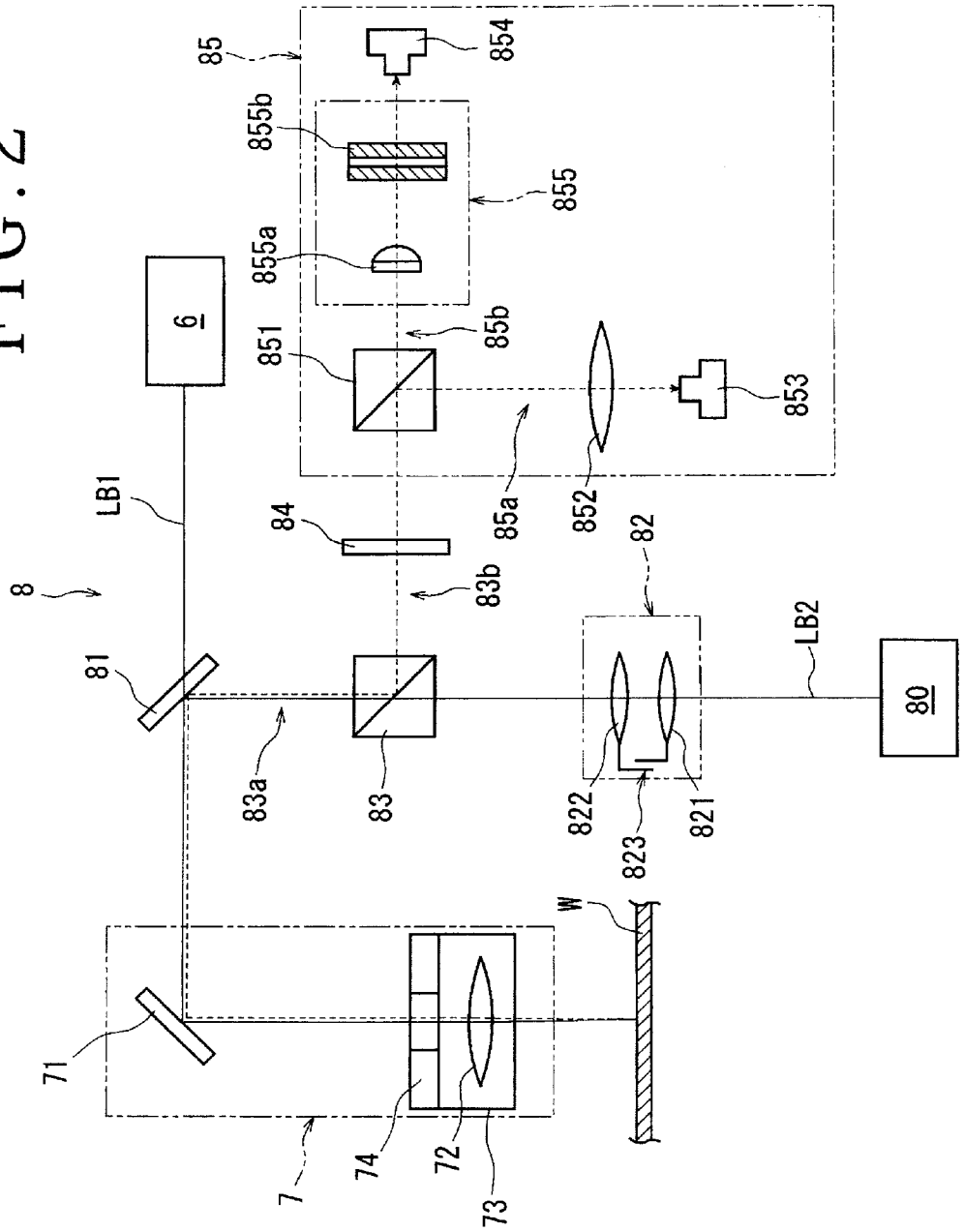
FIG. 2 is a block diagram showing the configurations of laser beam irradiation means and height position detecting means for a workpiece held on a chuck table, which are provided in the laser beam machining apparatus shown in FIG. 1 is equipped.

The laser beam irradiation means 52 includes a hollow cylindrical casing 521 disposed substantially horizontally. Machining pulsed laser beam oscillating means 6 is disposed in the casing 521 as shown in FIG. 2, and a condenser 7 by which a machining pulsed laser beam oscillated by the machining pulsed laser beam oscillating means 6 is radiated onto the workpiece held on the chuck table 36 is disposed at the tip of the casing 521. The machining pulsed laser beam oscillating means 6 oscillates a machining pulsed laser beam LB1 of such a wavelength as to be transmitted through a wafer, which is the workpiece to be machined. As the machining pulsed laser beam oscillating means 6, for example, a YVO4 pulsed laser oscillator or a YAG pulsed laser oscillator which is operative to oscillate the machining pulsed laser beam LB1 with a wavelength of 1064 nm can be used.

The condenser 7 includes a deflecting mirror 71 by which the machining pulsed laser beam LB1 oscillated from the machining pulsed laser beam oscillating means 6 is deflected toward the lower side in FIG. 2, a condenser lens 72 for condensing the machining pulsed laser beam LB1 deflected by the deflecting mirror 71, and an actuator 74 by which the case 73 containing the condenser lens 72 therein is moved in a direction (the vertical direction in FIG. 2) perpendicular to the holding surface (the upper surface) of the chuck table 36. The actuator 74, in the embodiment shown in the figures, is composed of a piezo motor which is composed of a piezoelectric element extending in an axial direction correspondingly to a voltage impressed thereon. Therefore, the actuator 74 composed of the piezo motor functions as second condenser point position adjusting means which is controlled by the control means (described later) to move the condenser lens 72 in the vertical direction in FIG. 2, thereby displacing the condensing point position of the machining pulsed laser beam LB1.

Continuing the description while referring to FIG. 2, the laser beam machining apparatus in the embodiment shown in the figure has height position detecting means 8 for detecting the height position of the upper surface of the workpiece held on the chuck table. The height position detecting means 8 includes detection laser beam oscillating means 80 for oscillating a detection laser beam, a dichroic mirror 81 which is disposed in a path between the machining pulsed laser beam oscillating means 6 and the condenser 7 and by which the detection laser beam oscillated from the detection laser beam oscillating means 80 is divided toward the condenser 7, condensing point position displacing means 82 which is disposed between the dichroic mirror 81 and the detection laser beam oscillating means 80 and which displaces a condensing point position into which the detection laser beam oscillated by the detection laser beam oscillating means 80 is condensed by the condenser lens 72 of the condenser 7 and a condensing point position into which the machining laser beam is condensed by the condenser lens 72 of the condenser 7, and a first beam splitter 83 which is disposed between the condensing point position displacing means 82 and the dichroic mirror 81 and by which the detection laser beam having passed through the condensing point position displacing means 82 is guided into a first path 83a leading toward the dichroic mirror 81.

As the detection laser beam oscillating means 80, there can be used, for example, a He—Ne pulsed laser oscillator operative to oscillate a detection laser beam LB2 having a wavelength which is different from the wavelength of the machining pulsed laser beam oscillated from the machining pulsed laser beam oscillating means 6 and which ensures reflection of the detection laser beam LB2 by the wafer serving as the workpiece, for example, 635 nm. Incidentally, in the embodiment shown in the figures, the output of the detection laser beam LB2 oscillated from the detection laser beam oscillating means 80 is set at 10 mW. The dichroic mirror 81 transmits the machining pulsed laser beam LB1 therethrough, but reflects the detection laser beam oscillated from the detection laser beam oscillating means 80 toward the condenser 7.

In the embodiment shown in the figures, the condensing point position displacing means 82 includes a pair of convex lenses 821, 822 arranged in series with a predetermined spacing therebetween along the optical path of the detection laser beam LB2, and spacing adjusting means 823 for adjusting the spacing between the pair of convex lenses 821, 822, and the spacing adjusting means 823 is controlled by the control means which will be described later. The first beam splitter 83 guides the detection laser beam LB2 having passed through the spacing adjusting means 823 into a first path 83a leading toward the dichroic mirror 81, and guides a reflected beam (described later) divided by the dichroic mirror 81 into a second path 83b.

The height position detecting means 8 includes a band-pass filter 84 which is disposed on the second path 83b and which transmits therethrough only the reflected beam corresponding to the wavelength (in the embodiment shown in the figures, 635 nm) of the detection laser beam LB2 of the reflected beam reflected by the first beam splitter 83, and reflected beam analyzing means 85 which analyzes the reflected beam transmitted through the band-pass filter 84 and which sends an analytical result to the control means (described later). The reflected beam analyzing means 85 includes a second beam splitter 851 by which the reflected beam transmitted through the band-pass filter 84 is split and guided into a third path 85a and a fourth path 85b, a condenser lens 852 for 100% condensation of the reflected beam split and guided into the third path 85a by the second beam splitter 851, and a first light receiving element 853 for receiving the reflected beam condensed by the condenser lens 852. The first light receiving element 853 sends to the control means (described later) a voltage signal corresponding to the quantity of light received.

In addition, the reflected beam analyzing means 85 in the embodiment shown in the figures includes a second light receiving element 854 for receiving the reflected beam split and guided into the fourth path 85b by the second beam splitter 851, and light reception region restricting means 855 for restricting the light reception region for the reflected beam received by the second light receiving element 854. In the embodiment shown in the figures, the light reception region restricting means 855 is composed of a cylindrical lens 855a for condensing the reflected beam split and guided into the fourth path 85b by the second beam splitter 851 into a one-dimensional (linear) form, and a one-dimensional mask 855b by which the reflected beam condensed into the one-dimensional form by the cylindrical lens 855a is restricted to unit length. The second light receiving element 854 for receiving the reflected beam transmitted through the one-dimensional mask 855b sends to the control means (described later) a voltage signal corresponding to the quantity of light received.

Figure 3A:
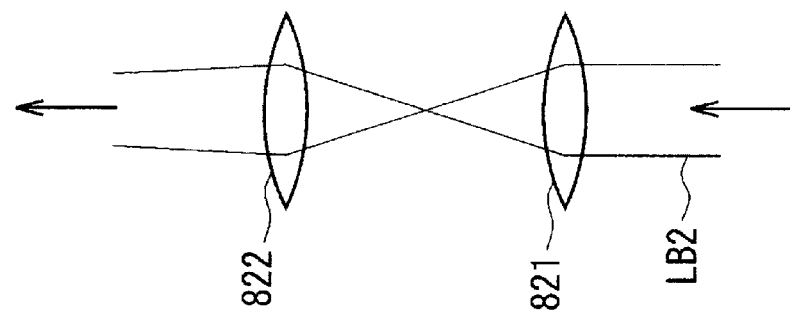
FIGS. 3A to 3C illustrate the modes in which the luminous flux of a laser beam is changed by condensing point position displacing means constituting the height position detecting means shown in FIG. 2.
Figure 3B:
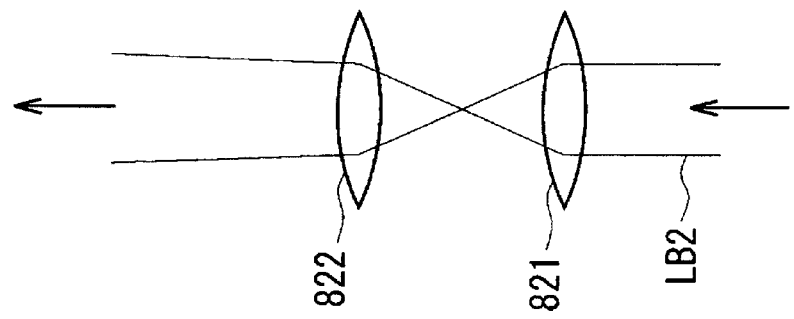
Figure 3C:
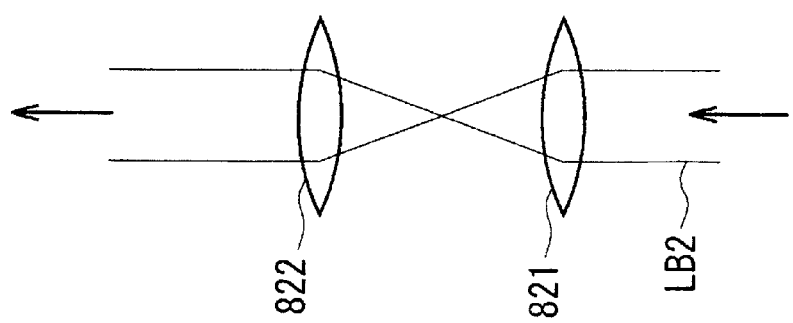

The height position detecting means 8 in the embodiment shown in FIG. 2 is configured as above-described, and it operates as described below. The detection laser beam LB2 composed of a parallel beam oscillated from the detection laser beam oscillating means 80 is condensed by the condenser lens 72 of the condenser 7 into a condensing point position, which is displaced by changing the spacing between the convex lenses 821 and 822 of the condensing point position displacing means 82. Specifically, when the convex lens 821 and the convex lens 822 are so disposed that their focal point positions coincide with each other as shown in FIG. 3A, the detection laser beam LB2 incident on the convex lens 821 is outputted from the convex lens 822 as a parallel beam. On the other hand, when the spacing between the convex lenses 821 and 822 is reduced as shown in FIG. 3B to be smaller than that in FIG. 3A, the detection laser beam LB2 entering the convex lens 821 is outputted from the convex lens 822 as a diverging beam. Further, when the spacing between the convex lenses 821 and 822 is enlarged as shown in FIG. 3C to be greater than that in FIG. 3A, the detection laser beam LB2 incident on the convex lens 821 is outputted from the convex lens 822 as a converging beam.

Figure 4A:
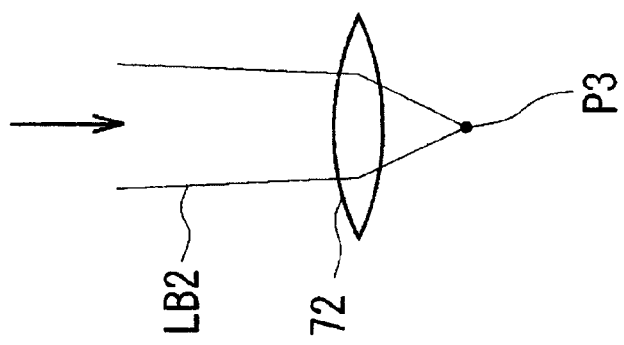
FIGS. 4A to 4C illustrate condensing conditions in which a detection laser beam is condensed by a condenser correspondingly to the modes of the condensing point position displacing means shown in FIGS. 3A to 3C.
Figure 4B:
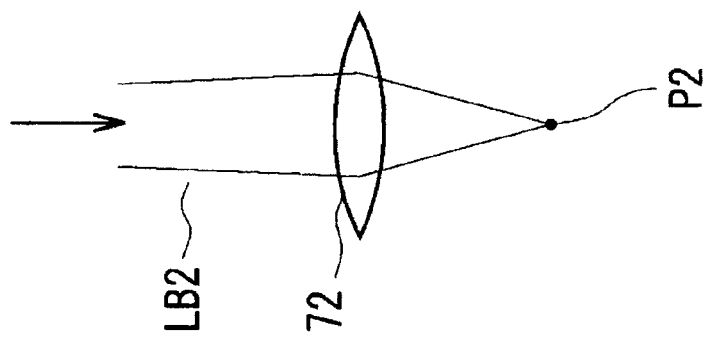
Figure 4C:
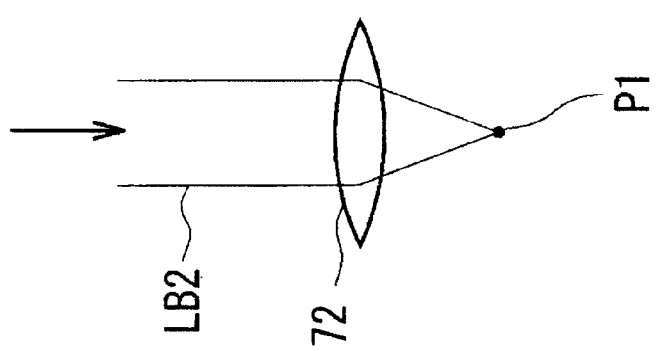

The detection laser beam LB2 outputted from the convex lens 822 of the condensing point position displacing means 82 as a parallel beam as shown in FIG. 3A is condensed by the condenser lens 72 of the condenser 7 into a condensing point position P1, as shown in FIG. 4A. This condensing point position P1 coincides with the condensing point position of the machining pulsed laser beam LB1. On the other hand, the detection laser beam LB2 outputted from the convex lens 822 of the condensing point position displacing means 82 as a diverging beam as shown in FIG. 3B is condensed by the condenser lens 72 of the condenser 7 into a condensing point position P2 located on the lower side in relation to the condensing point position P1, as shown in FIG. 4B. Further, the detection laser beam LB2 outputted from the convex lens 822 of the condensing point position displacing means 82 as a converging beam as shown in FIG. 3C is condensed by the condenser lens 72 of the condenser 7 into a condensing point position P3 located on the upper side in relation to the condensing point position P1, as shown in FIG. 4C.

Figure 5:
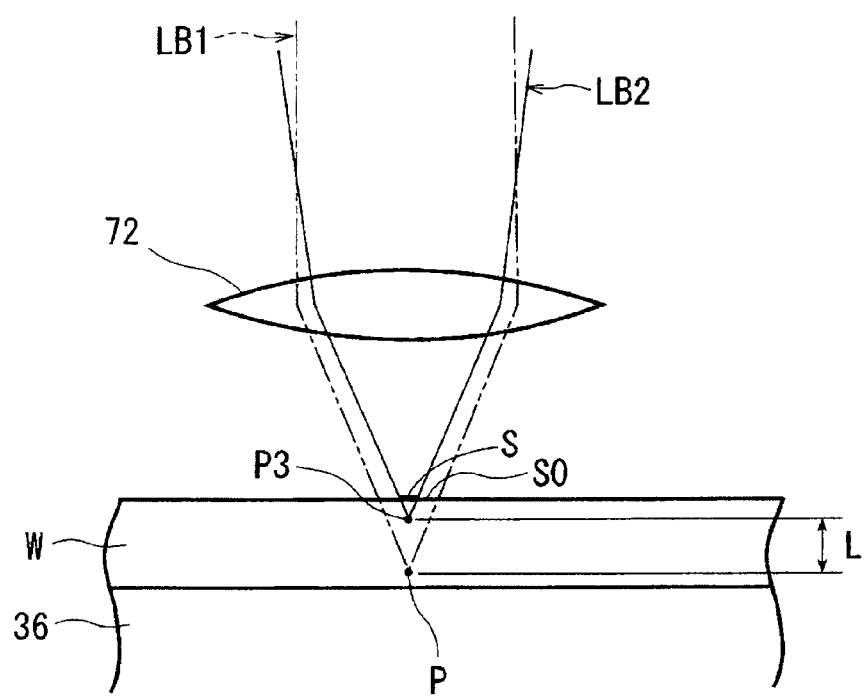
FIG. 5 illustrates a condensing point position of a machining laser beam and a condensing point position of the detection laser beam, the laser beams being condensed by a condenser lens provided in the laser beam machining apparatus shown in FIG. 1.

Here, the condensing point positions of the detection laser beam LB2 and the machining pulsed laser beam LB1 which are condensed by the condenser 7 will be described referring to FIG. 5. Incidentally, the spacing between the convex lenses 821 and 822 of the condensing point position displacing means 82 is assumed to be that in the mode shown in FIG. 3C. The machining pulsed laser beam LB1 is condensed by the condenser lens 72 of the condenser 7 into a condensing point position P. On the other hand, the detection laser beam LB2 is condensed by the condenser lens 72 of the condenser 7 into the condensing point position P3 located on the upper side in relation to the condensing point position P, as above-mentioned. Incidentally, the distance (L) between the condensing point position P of the machining pulsed laser beam LB1 and the condensing point position P3 of the detection laser beam LB2 can be changed by regulating the spacing between the convex lenses 821 and 822 of the condensing point position displacing means 82.

Incidentally, the condensing point position displacing means 82 for displacing the condensing point position into which the detection laser beam oscillated by the detection laser beam oscillating means 80 is condensed by the condenser lens 72 of the condenser 7 and the condensing point position into which the machining laser beam is condensed by the condenser lens 72 of the condenser 7 may be disposed in a path from the machining pulsed laser beam oscillating means 6 and the dichroic mirror 81.

Then, a predetermined voltage (for example, 5 V) is impressed on the actuator 74 provided as the second condensing point position adjusting means so that the condensing point position P of the machining pulsed laser beam LB1 is positioned into a position which is deviated by a predetermined amount to the upper side from the lower surface of the workpiece W held on the chuck table 36. In this case, the spacing between the convex lenses 821 and 822 of the condensing point position displacing means 82 is so adjusted that the condensing point position P3 of the detection laser beam LB2 is located on the lower side (the downstream side in the laser beam radiating direction) in relation to the upper surface of the workpiece W. Therefore, the detection laser beam LB2 is radiated onto the upper surface of the workpiece W held on the chuck table 36 in the form of a spot S, and is reflected from the upper surface in the size of the spot S. Thus, the spot S of the detection laser beam LB2 radiated onto the upper surface of the workpiece W held on the chuck table 36 is conspicuously smaller than the spot S0 in the case where the condensing point position of the detection laser beam LB2 coincides with the condensing point position of the machining pulsed laser beam LB1, and, accordingly, the quantity of light per unit area of the reflected beam is larger. Consequently, the height position of the workpiece W held on the chuck table 36 which is determined by the reflected beam analyzing means 85 on the basis of the quantity of light of the reflected beam is accurate.

The reflected beam thus reflected on the upper surface of the workpiece W in the size of the spot S is transmitted through the condenser lens 72, the deflecting mirror 71, the dichroic mirror 81, and the first beam splitter 83 to reach the band-pass filter 84, as shown in FIG. 2. Incidentally, the reflected beam of the machining pulsed laser beam LB1 also is transmitted through the same path as that for the detection laser beam LB2, to reach the band-pass filter 84. As above-mentioned, the band-pass filter 84 is so configured as to permits transmission therethrough of only the reflected beam corresponding to the frequency of the detection laser beam LB2, and, therefore, the reflected beam of the machining pulsed laser beam LB1 is intercepted by the band-pass filter 84. Consequently, only the reflected beam of the detection laser beam LB2 is transmitted through the band-pass filter 84, to be split and guided into the third path 85a and the fourth path 85b by the second beam splitter 851 constituting the reflected beam analyzing means 85.

The reflected beam of the detection laser beam LB2 split and guided into the third path 85a undergoes 100% condensation by the condenser lens 852, before being received by the first light receiving element 853. Then, the first light receiving element 853 sends to the control means (described later) a voltage signal corresponding to the quantity of light received. On the other hand, the reflected beam of the detection laser beam LB2 split and guided into the fourth path 85b is condensed into a one-dimensional (linear) form by the cylindrical lens 855a of the light reception region restricting means 855, and is restricted by the one-dimensional mask 855b to predetermined unit length, before being received by the second light receiving element 854. Then, the second light receiving element 854 sends to the control means (described later) a voltage signal corresponding to the quantity of light received.

Here, the quantities of light of the reflected beams of the detection laser beam LB2 which are received by the first light receiving element 853 and the second light receiving element 854 will be described. The reflected beam received by the first light receiving element 853 undergoes 100% condensation by the condenser lens 852, so that the quantity of light received in this case is constant; therefore, the voltage (V1) outputted from the first light receiving element 853 is constant (for example, 10 V). On the other hand, the reflected beam received by the second light receiving element 854 is condensed into the one-dimensional form by the cylindrical lens 855a of the light reception region restricting means 855 and then restricted to the predetermined unit length by the one-dimensional mask 855b, before being received by the second light receiving element 854. Therefore, the quantity of light received by the second light receiving element 854 varies depending on the distance from the condenser lens 72 of the condenser 7 to the upper surface of the workpiece W, in other words, depending on the height position (or thickness) of the workpiece W, in the process of irradiation of the upper surface of the workpiece W with the detection laser beam LB2 as shown in FIG. 5. Accordingly, the voltage (V2) outputted from the second light receiving element 854 varies depending on the height position of the upper surface of the workpiece W irradiated with the detection laser beam LB2.

Figure 6A:
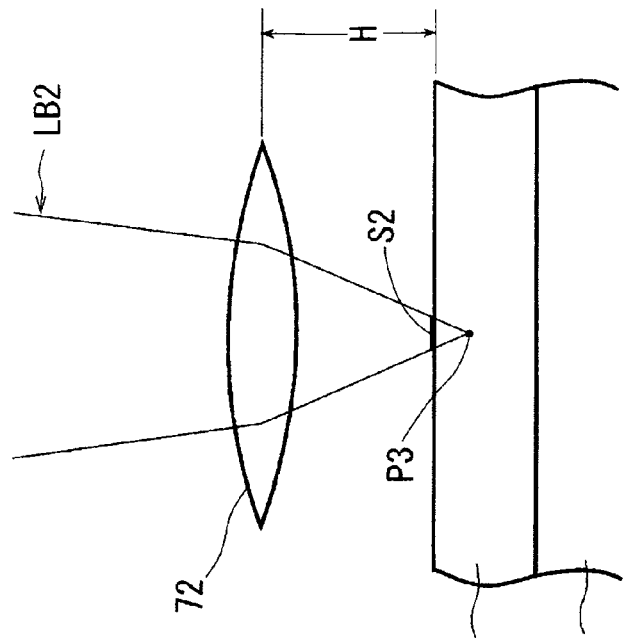
FIGS. 6A and 6B illustrate the conditions in which workpieces differing in thickness and each held on the chuck table are irradiated with the detection laser beam by the height position detecting means shown in FIG. 2.

For example, in the case where the height position of the workpiece W is low (the thickness of the workpiece W is small) as shown in FIG. 6A and the distance (H) from the condenser lens 72 of the condenser 7 to the upper surface of the workpiece W is large, the detection laser beam LB2 is reflected in the form of a spot S1 in which it is radiated onto the upper surface of the workpiece W. While the reflected beam is split and guided into the third path 85a and the fourth path 85b by the second beam splitter 851 as above-mentioned, the reflected beam relevant to the spot S1 split and guided into the third path 85a undergoes 100% condensation by the condenser lens 852 and, hence, the whole quantity of light of the reflected beam is received by the first light receiving element 853. On the other hand, the reflected beam relevant to the spot S1 split and guided into the fourth path 85b by the second beam splitter 851 is condensed into a one-dimensional (linear) form by the cylindrical lens 855a, so that the condensed reflected beam is substantially rectangular in sectional shape. The reflected beam thus condensed into a substantially rectangular shape in section is restricted to predetermined unit length by the one-dimensional mask 855b, so that a portion of the reflected beam split and guided into the fourth path 85b is received by the second light receiving element 854. Accordingly, the quantity of light of the reflected beam received by the second light receiving element 854 is smaller than the quantity of light received by the first light receiving element 853 mentioned above.

Figure 6B:
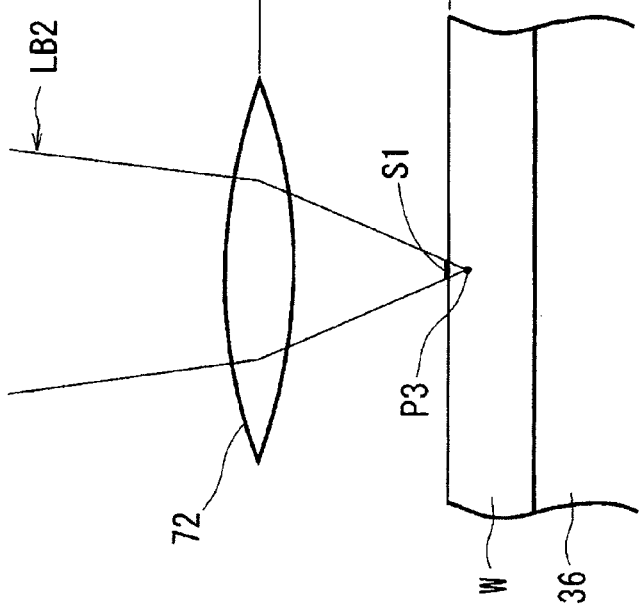

In the next place, in the case where the height position of the workpiece W is high (the thickness of the workpiece W is large) as shown in FIG. 6B and the distance (H) from the condenser lens 72 of the condenser 7 to the upper surface of the workpiece W is small, the detection laser beam LB2 is reflected in the form of the spot S2 in which it is radiated onto the upper surface of the workpiece W. This ring-shaped spot S2 is larger than the spot S1. While the reflected beam relevant to the spot S2 is split and guided into the third path 85a and the fourth path 85b by the second beam splitter 851 as above-mentioned, the reflected light relevant to the spot S2 split and guided into the third path 85a undergoes 100% condensation by the condenser lens 852, so that the whole quantity of light of the reflected beam is received by the first light receiving element 853. On the other hand, the reflected beam relevant to the spot S2 split and guided into the fourth path 85b by the second beam splitter 851 is condensed into the one-dimensional (linear) form by the cylindrical lens 855a, so that the condensed reflected beam is substantially rectangular in sectional shape.

The length of the major side of the substantially rectangular shape is greater than that in the case of the spot S1, since the spot S2 of the reflected light is greater than the ring-shaped spot S1. The reflected light thus condensed into the substantially rectangular shape in section is curtailed (restricted) to a predetermined length by the one-dimensional mask 855b so that a portion thereof is received by the second light receiving element 854. Therefore, the quantity of light received by the second light receiving element 854 is smaller than that in the case of FIG. 6A. Thus, the quantity of light of the reflected beam received by the second light receiving element 854 is larger as the distance (H) from the condenser lens 72 of the condenser 7 to the upper surface of the workpiece W is longer, i.e., the height position of the workpiece W is lower (the thickness of the workpiece W is smaller), and the quantity of light received is smaller as the distance (H) from the condenser lens 72 of the condenser 7 to the upper surface of the workpiece W is shorter, i.e., the height position of the workpiece W is higher (the thickness of the workpiece W is greater).

Here, the relation between the ratio of the voltage (V1) outputted from the first light receiving element 853 to the voltage (V2) outputted from the second light receiving element 854 and the distance (H) from the condenser lens 72 of the condenser 7 to the upper surface of the workpiece W, or the height position of the workpiece W, will be described referring to the control map shown in FIG. 7. Incidentally, in FIG. 7, the axis of abscissas represents the ratio (V1/V2) of the voltage (V1) outputted from the first light receiving element 853 to the voltage (V2) outputted from the second light receiving element 854, and the axis of ordinates represents the displacement relative to a predetermined distance (reference value) from the condenser lens 72 of the condenser 7 to the upper surface of the workpiece W. In the example shown in FIG. 7, in the condition where a predetermined voltage (for example, 5 V) is impressed on the actuator 74 provided as the second condensing point position adjusting means as above-mentioned, the voltage ratio (V1/V2) is set to "5," while the displacement in the case where the distance (H) from the condenser lens 72 of the condenser 7 to the upper surface of the workpiece W is 30.0 mm is taken as a reference value (0).

Figure 7:
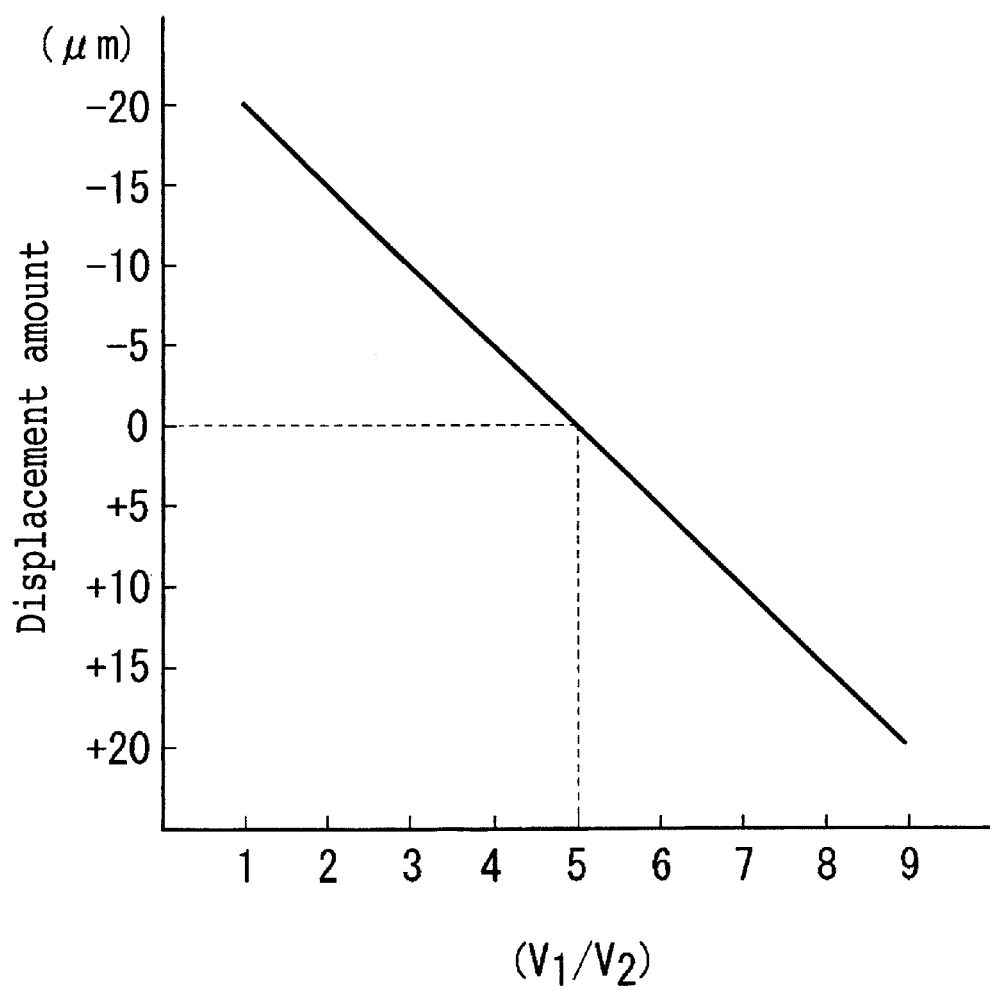
FIG. 7 is a control map showing the relation between the ratio of a voltage (V1) outputted from a first light receiving element constituting the height position detecting means shown in FIG. 2 to a voltage (V2) outputted from a second light receiving element constituting the height position detecting means and displacement evaluated taking a predetermined distance from the condenser to the upper surface of the workpiece as a reference.

In the case where the height position of the workpiece W held on the chuck table is lower (the thickness of the workpiece W is smaller) than the reference value, the distance (H) from the condenser lens 72 of the condenser 7 to the upper surface of the workpiece W is longer, so that the voltage ratio (V1/V2) is greater than "5." On the other hand, in the case where the height position of the workpiece W held on the chuck table is higher (the thickness of the workpiece W is larger) than the reference value, the distance (H) from the condenser lens 72 of the condenser 7 to the upper surface of the workpiece W is shorter, so that the voltage ratio (V1/V2) is smaller than "5." Therefore, by determining the ratio (V1/V2) of the voltage (V1) outputted from the first light receiving element 853 to the voltage (V2) outputted from the second light receiving element 854 as above-mentioned and collating the voltage ratio (V1/V2) with the control map shown in FIG. 7, it is possible to determine the distance (H) from the condenser lens 72 of the condenser 7 to the upper surface of the workpiece W, or the displacement from the above-mentioned reference value. Incidentally, the control map shown in FIG. 7 is stored in a memory in the control means which will be described later.

Continuing the description by returning to FIG. 1, image pick-up means 9 for detecting a workpiece region to be laser beam machined by the laser beam irradiation means 52 is disposed at a tip part of the casing 521 constituting the laser beam irradiation means 52. The image pick-up means 9 is composed of infrared illuminating means for radiating infrared ray onto the workpiece, an optical system for catching the infrared rays radiated by the infrared illuminating means, an image pick-up element (infrared CCD) for outputting an electrical signal corresponding to the infrared rays caught by the optical system, or the like, in addition to an ordinary image pick-up element (CCD) for picking up an image by use of a visible beam, and sends to the control means (described later) a picture signal indicative of the image picked up.

Figure 8:
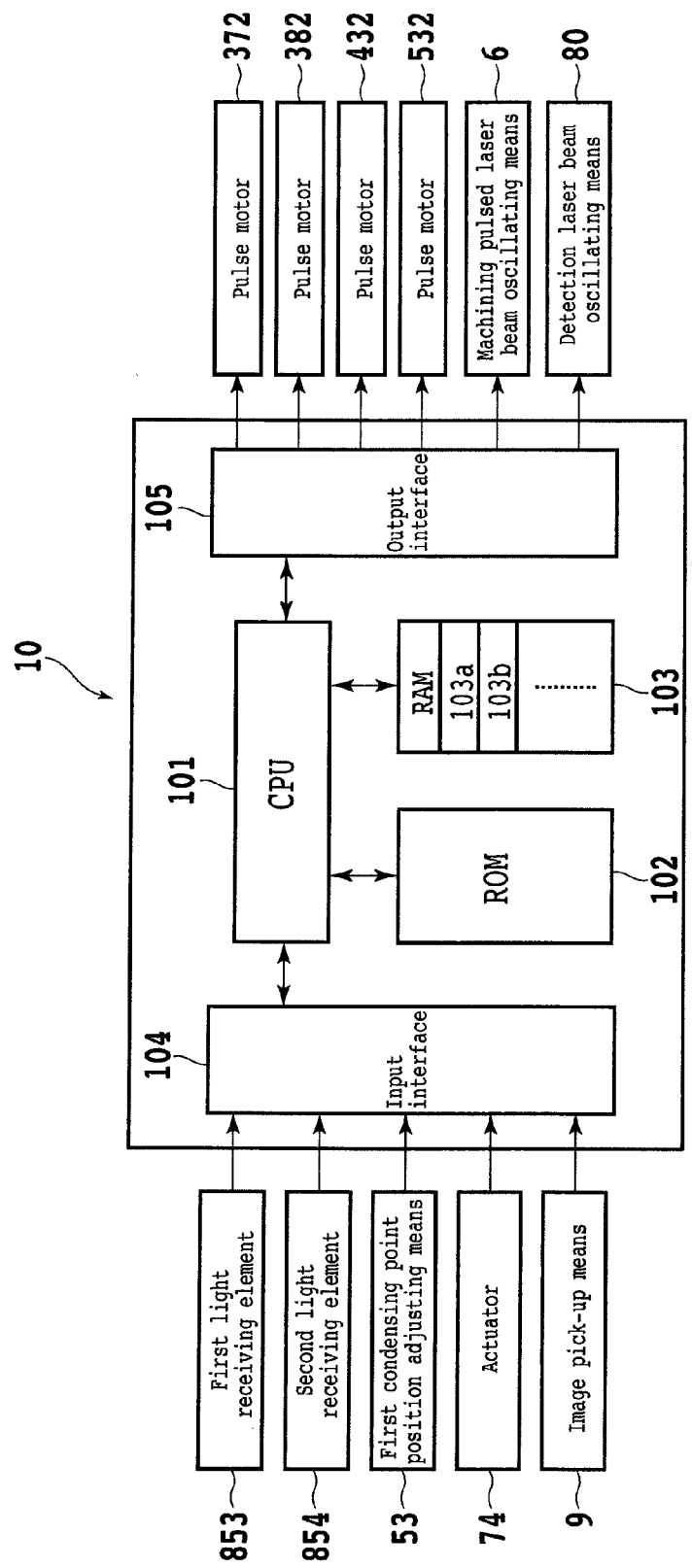
FIG. 8 is a block diagram showing control means provided in the laser beam machining apparatus shown in FIG. 1.

The laser beam machining apparatus in the embodiment shown in the figures has the control means 10 shown in FIG. 8. The control means 10 is composed of a computer, and includes a central processing unit (CPU) 101 for executing arithmetic operations according to a control program, a read only memory (ROM) 102 for storing the control program and the like, a writable/readable random access memory (RAM) 103 for storing the results of arithmetic operations and the like, an input interface 104 and an output interface 105. The input interface 104 of the control means 10 is supplied with detection signals from the first light receiving element 853, the second light receiving element 854, the image pick-up means 9 and the like. Control signals are outputted from the output interface 105 of the control means 10 to the pulse motor 372, the pulse motor 382, the pulse motor 432, the pulse motor 532, the machining pulsed laser beam oscillating means 6, the actuator 74 as the second condensing point position adjusting means, the detection laser beam oscillating means 80 and the like.

Figure 9:
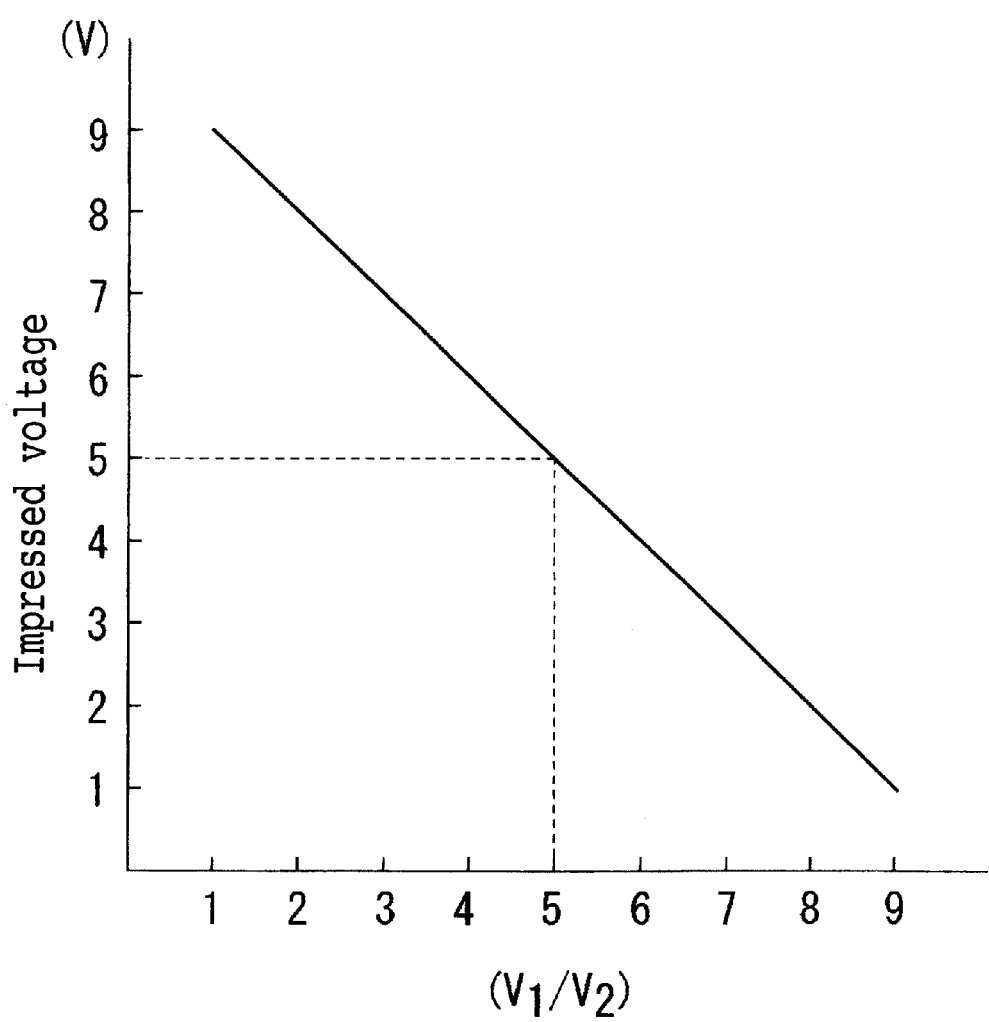
FIG. 9 is a control map showing the relation between the ratio of the voltage (V1) outputted from the first light receiving element constituting the height position detecting means shown in FIG. 2 to the voltage (V2) outputted from the second light receiving element constituting the height position detecting means and a voltage to be impressed on an actuator constituting the condenser.

Incidentally, the random access memory (RAM) 103 has a first storage area 103a for storing the control map shown in FIG. 7, a second storage area 103b for storing a control map in which a voltage to be impressed on the actuator 74 provided as the second condensing point position adjusting means is set correspondingly to the ratio (V1/V2) of the voltage (V1) outputted from the first light receiving element 853 to the voltage (V2) outputted from the second light receiving element 854 as shown in FIG. 9, and other storage areas. Incidentally, the control map shown in FIG. 9 is so designed that the voltage to be impressed in the case where the voltage ratio (V1/V2) is "5" is set to be 5 V. In addition, the control map is so designed that when the voltage ratio (V1/V2) is lower than "5," the voltage to be impressed on the actuator 74 is higher so as to move the condenser lens 72 downwards, and when the voltage ratio (V1/V2) is higher than "5," the voltage to be impressed on the actuator 74 is lower so as to move the condenser lens 72 upwards. Therefore, by controlling the voltage to be impressed on the actuator 74 according to the control map shown in FIG. 9, a control is realized such that the ratio (V1/V2) of the voltage (V1) outputted from the first light receiving element 853 of the height position detecting means 8 to the voltage (V2) outputted from the second light receiving element 854 is brought to "5." Consequently, the distance (H) from the condenser lens 72 of the condenser 7 to the upper surface of the workpiece W is controlledly kept at a constant value.

Figure 10:
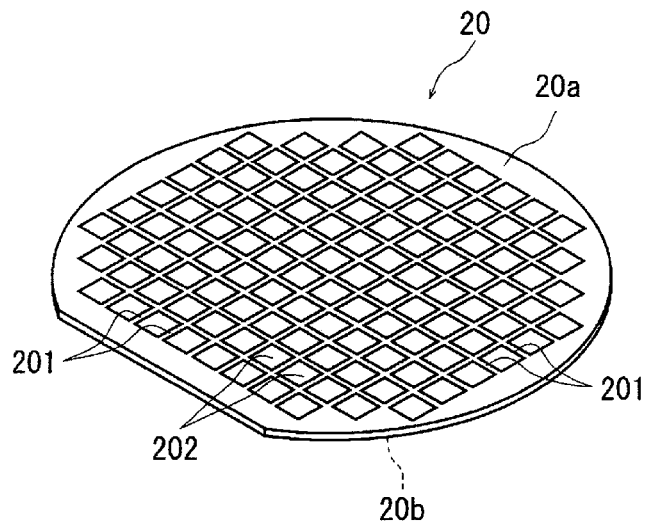
FIG. 10 is a perspective view of an optical device wafer as a workpiece to be machined.

The laser beam machining apparatus in the embodiment shown in the figures is configured as above-described, and it operates as described below. FIG. 10 shows a perspective view of a semiconductor wafer 20 as a workpiece to be laser beam machined. The semiconductor wafer 20 shown in FIG. 10 is composed of a silicon wafer, in which a plurality of regions are demarcated by a plurality of streets 201 arrayed in a grid form on a face-side surface 20a, and devices 202 such as ICs and LSIs are formed in the thus demarcated regions.

Figure 11:
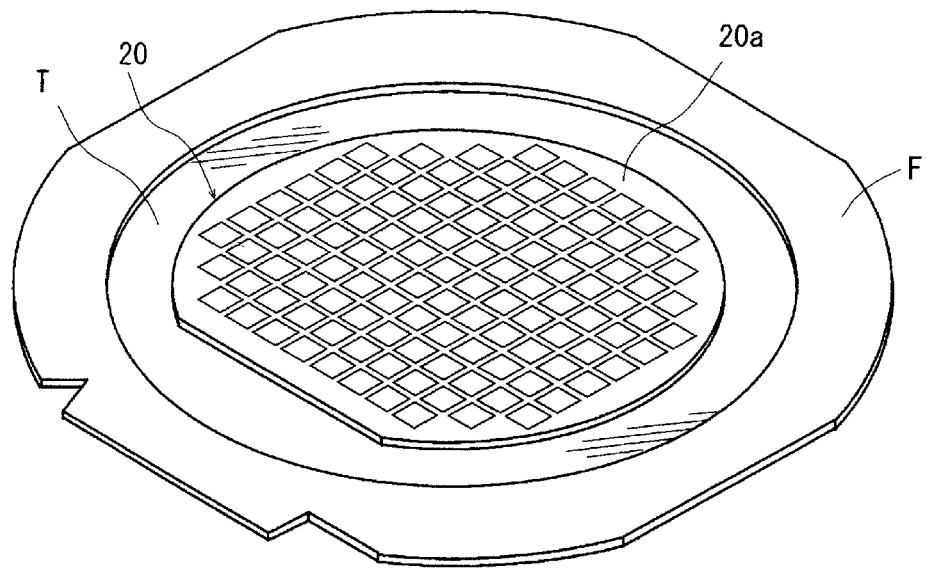
FIG. 11 is a perspective view showing the condition in which the optical device wafer shown in FIG. 10 is adhered to a surface of a dicing tape attached to an annular frame.

In order to form laser beam-machined grooves along the streets 201 on the semiconductor wafer 20, the semiconductor wafer 20 is adhered to a dicing tape T attached to an annular frame F, as shown in FIG. 11. In this instance, the back side of the semiconductor wafer 20 is adhered to the dicing tape T, with the face-side surface 20a of the semiconductor wafer 20 up.

An embodiment of laser beam machining conducted by use of the above-described laser beam machining apparatus wherein the semiconductor wafer 20 is irradiated with the laser beam along the planned dividing lines (streets) 201 to provide the semiconductor wafer 20 with the laser beam-machined grooves along the streets 201, will now be described below. First, the semiconductor wafer 20 is mounted on the chuck table 36 of the above-mentioned laser beam machining apparatus shown in FIG. 1, with its face-side surface 20a up, and the semiconductor wafer 20 is suction held on the chuck table 36. The chuck table 36 with the semiconductor wafer 20 suction held thereon is positioned into a position just under the image pick-up means 9.

After the chuck table 36 is thus positioned into the position just under the image pick-up means 9, an alignment workpiece for detecting the workpiece area of the semiconductor wafer 20 which is to be laser beam machined is carried out by the image pick-up means 9 and the control means 10. Specifically, the image pick-up means 9 and the control means 10 perform alignment by a method in which image processing operations such as pattern matching for matching the street 201 formed in a predetermined direction on the semiconductor wafer 20 to the condenser 7 of the laser beam irradiation means 52 are carried out. In addition, alignment is similarly carried out also for the street 201 formed on the semiconductor wafer 20 in a direction orthogonal to the predetermined direction.

Figure 12A:
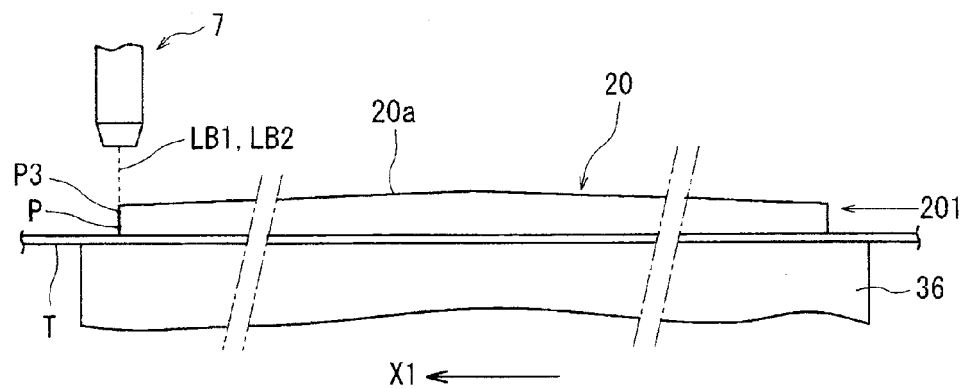
FIGS. 12A to 12C illustrate laser beam machining steps for carrying out laser beam machining of the optical device wafer shown in FIG. 10 along streets by the laser beam machining apparatus shown in FIG. 1.

After the alignment is carried out as above-mentioned, the chuck table 36 is moved so that one end (in FIG. 12A, the left end) of the predetermined street 201 is positioned into the position just under the condenser 7, as shown in FIG. 12A. Then, a predetermined voltage (for example, 5 V) is impressed on the actuator 74 as the second condensing point position adjusting means, and the first condensing point position adjusting means 53 is operated so that the condensing point position of the machining pulsed laser beam LB1 and the condensing point position of the detection laser beam LB2 are set into the condition shown in FIG. 5. As a result, the condensing point position P of the machining pulsed laser beam LB1 is positioned into a predetermined position of depth from the surface of the semiconductor wafer 20.

Next, the height position detecting means 8 is operated so as to radiate the detection laser beam LB2 onto the upper surface of the semiconductor wafer 20 held on the chuck table 36, the chuck table 36 is moved in the direction indicated by arrow X1 in FIG. 12A, and the machining pulsed laser beam oscillating means 6 is operated, to radiate the machining pulsed laser beam LB1 (laser beam machining step). In the laser beam machining step, the control means 10 computes the ratio (V1/V2) of the voltage (V1) outputted from the first light receiving element 853 of the height position detecting means 8 to the voltage (V2) outputted from the second light receiving element 854, then, based on the voltage ratio (V1/V2), obtains the voltage to be impressed on the actuator 74 as the second condensing point position adjusting means from the control map shown in FIG. 9, and applies the thus obtained voltage to the actuator 74. To be more specific, the control means 10 controls the voltage to be impressed on the actuator 74 in such a manner that the ratio (V1/V2) of the voltage (V1) outputted from the first light receiving element 853 of the height position detecting means 8 to the voltage (V2) outputted from the second light receiving element 854 will be "5."

Figure 12B:
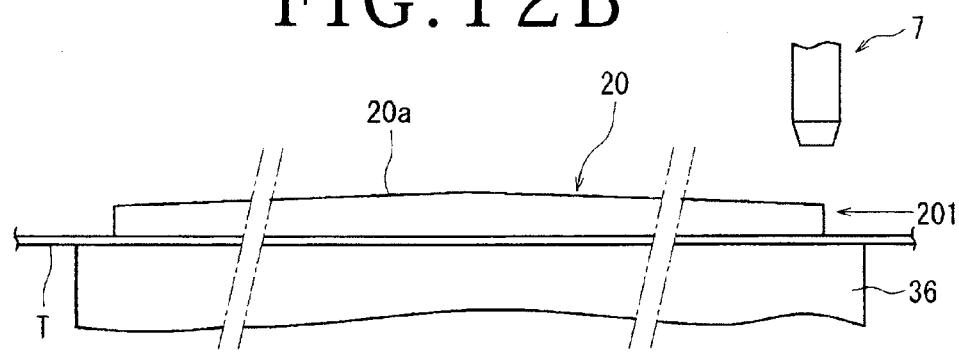
Figure 12C:
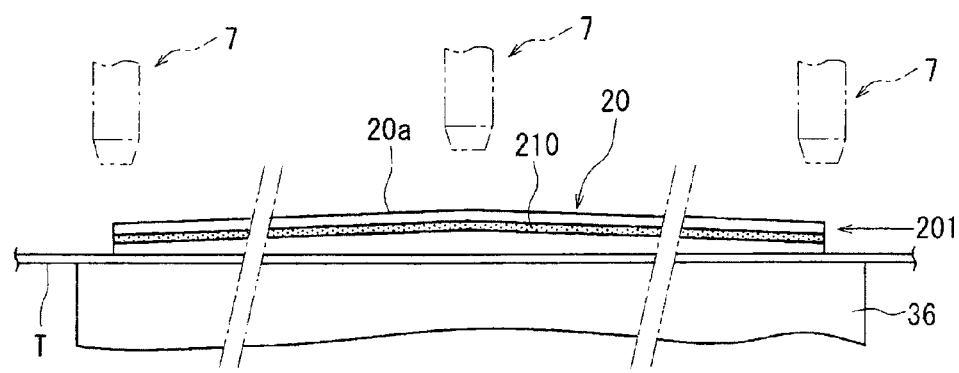

Then, when the other end (in FIG. 12B, the right end) of the street 201 has arrived at the position just under the condenser 7 as shown in FIG. 12B, the operations of the height position detecting means 8 and the machining pulsed laser beam oscillating means 6 are stopped, and the movement of the chuck table 36 is stopped. As a result of the above, the condenser 7 is moved up and down correspondingly to the ruggedness of the semiconductor wafer 20 as shown in FIG. 12C, and the distance (H) from the condenser lens 72 of the condenser 7 to the upper surface of the semiconductor wafer 20 is controlledly kept at a predetermined value. Accordingly, the semiconductor wafer 20 is formed with a denatured layer 210 at an even, predetermined position of depth from the upper surface, as shown in FIG. 12C.

Incidentally, the machining conditions in the laser beam machining step are set, for example, as follows.

Laser: YVO4, pulsed laser
Wavelength: 1064 nm
Repetition frequency: 200 kHz
Mean output: 1 W
Condensed beam spot diameter: φ1 μm
Machining feed rate: 300 mm/sec Incidentally, in the case where the thickness of the semiconductor wafer 20 is thick and a multiplicity of denatured layers are to be formed, it suffices to carry out the laser beam machining by a method in which the spacing adjusting means 823 of the condensing point position displacing means 82 is controlled to adjust the spacing between the convex lenses 821 and 822, thereby changing the distance (L) between the condensing point position of the machining pulsed laser beam LB1 and the condensing point position of the detection laser beam LB2.

Besides, a method may be adopted in which the displacement amount in the surface position along the street 201 of the semiconductor wafer 20 detected by the height position detecting means 8 in the first run of laser beam machining step is stored in the read only memory (ROM) 102 in the control means 10, and, in the second run of laser beam machining step, the detection by the height position detecting means 8 is stopped, and the actuator 74 is controlled based on the data stored in the read only memory (ROM) 102.

After the laser beam machining step for the semiconductor wafer 20 is carried out along all the streets 201 extending in the predetermined direction, the chuck table 36 is rotated by 90 degrees, and the laser beam machining is conducted along each street 201 extending in the direction perpendicular to the predetermined direction. After the laser beam machining step is carried out along all the streets 201 formed on the semiconductor wafer 20 as above, the chuck table 36 holding the semiconductor wafer 20 is returned to the position where the semiconductor wafer 20 has been suction held in the beginning, and the suction holding is canceled in this position. Then, the semiconductor wafer 20 is conveyed by conveying means (not shown) to a dividing step.

Now, another embodiment of the height position detecting means for detecting the height position of the upper surface of the workpiece held on the chuck table provided in the laser beam machining apparatus according to the present invention will be described, referring to FIGS. 13 to 15. Incidentally, the height position detecting means shown in FIGS. 13 to 15 may have substantially the same component members as those of the laser beam machining apparatus shown in FIG. 2 above, except for the condensing point position displacing means; therefore, the same members as above are denoted by the same reference symbols as used above, and descriptions of them are omitted here.

Figure 13:
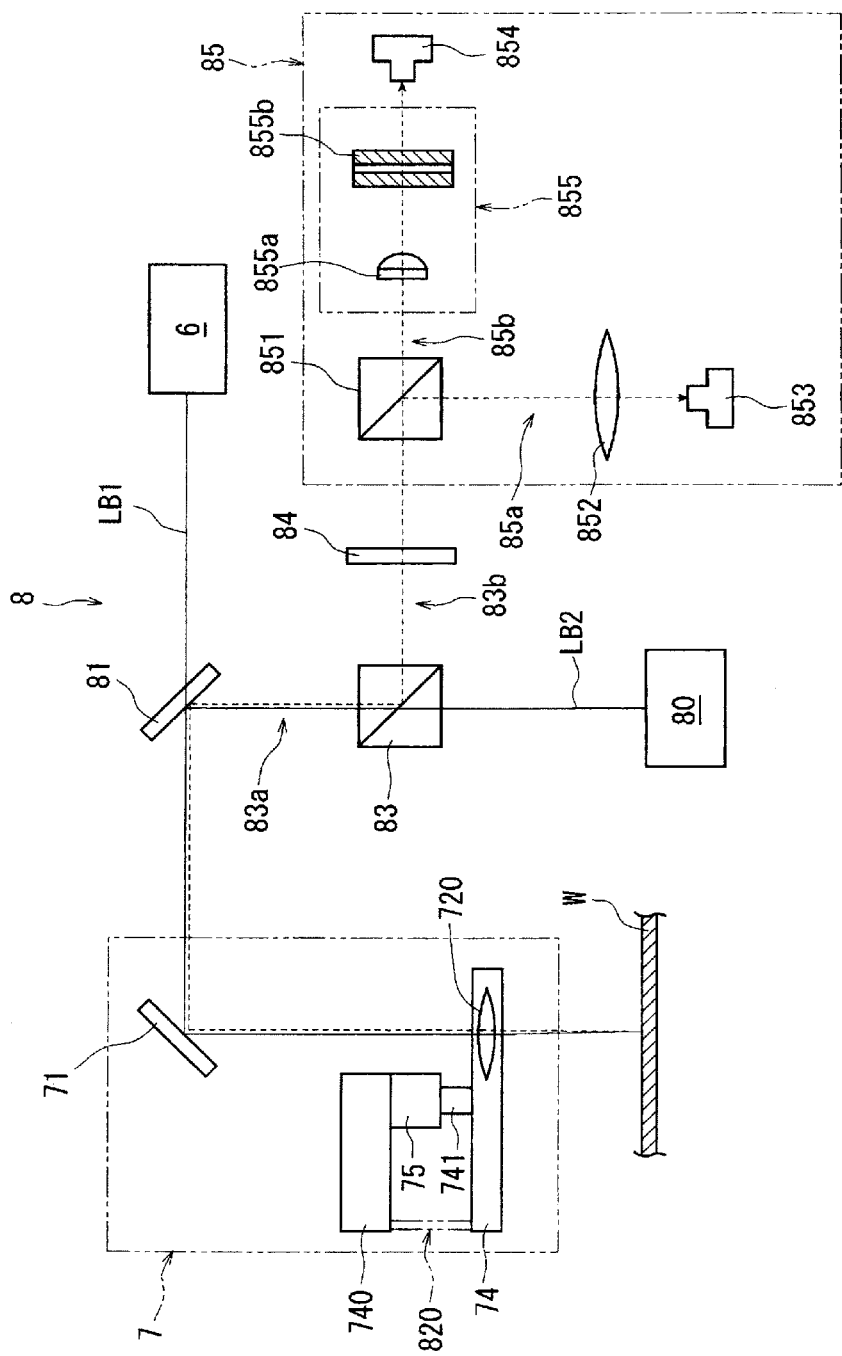
FIG. 13 is a block diagram showing the configurations, according to another embodiment, of the laser beam irradiation means and the height position detecting means for the workpiece held on the chuck table, which are provided in the laser beam machining apparatus shown in FIG. 1.
Figure 14:
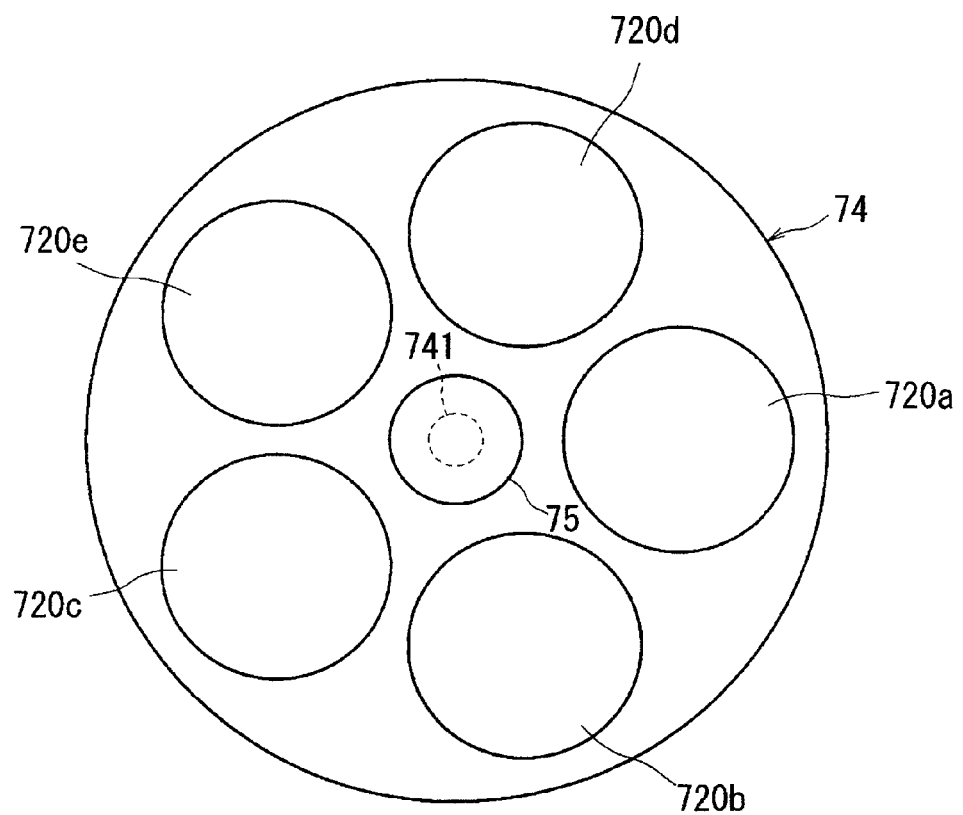
FIG. 14 is a plan view of a plurality of chromatic aberration lenses and lens positioning means constituting a condenser lens of the height position detecting means shown in FIG. 13.
Figure 15:
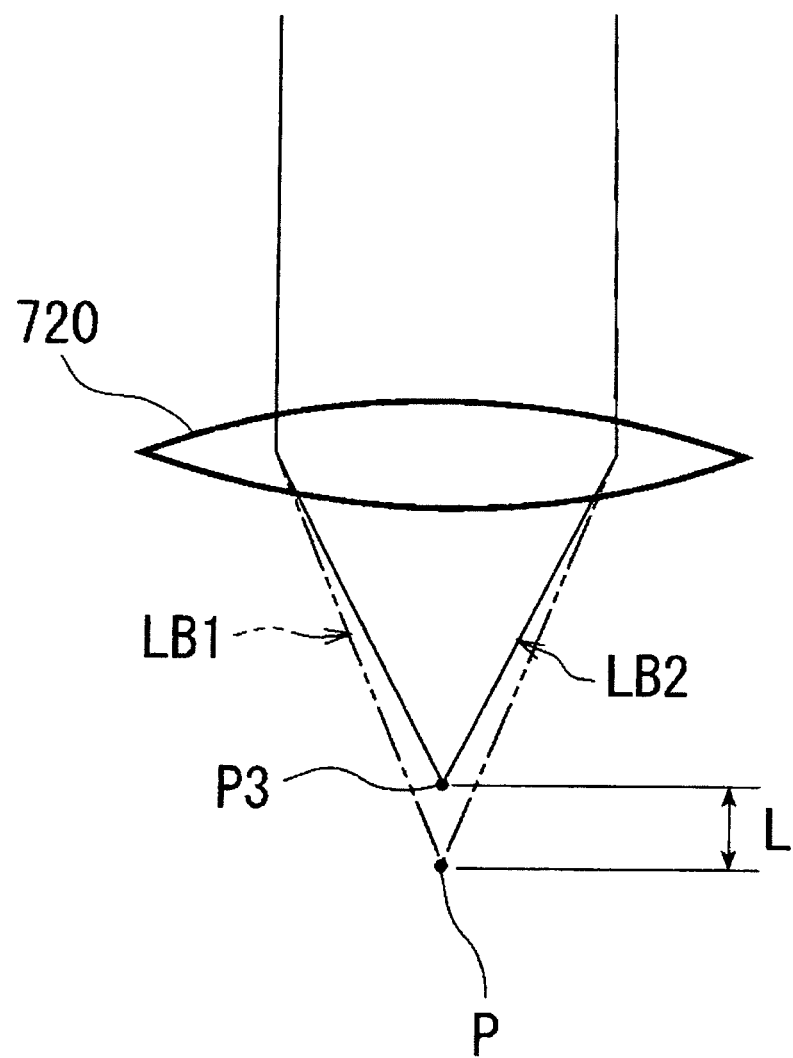
FIG. 15 illustrates the condensing point position of the machining laser beam and the condensing point position of the detection laser beam, the laser beams being condensed by the plurality of chromatic aberration lenses constituting the condenser lens of the height position detecting means shown in FIG. 14.

The laser beam machining apparatus shown in FIGS. 13 to 15 has a configuration in which condensing point position displacing means 820 is disposed in a condenser 7, in place of the condensing point position displacing means 82 shown in FIG. 2. The condensing point position displacing means 820 of the laser beam machining apparatus shown in FIGS. 13 to 15 has a configuration in which a condenser lens 720 constituting the condenser 7 includes a plurality of chromatic aberration lenses 720a, 720b, 720c, 720d, 720e, as shown in FIG. 14. The chromatic aberration lenses 720a, 720b, 720c, 720d, 720e are so designed that the distance between the condensing point position P of a machining pulsed laser beam LB1 (wavelength: 1064 nm) and the condensing point position P3 of a detection laser beam LB2 (635 nm), i.e., the condensing point difference (L), differs correspondingly to the wavelength of the laser beam to be condensed, as shown in FIG. 15. For instance, in the embodiment shown in the figures, the chromatic aberration lens 720a is set to have a condensing point difference (L) of 25 μm, the chromatic aberration lens 720b is set to have a condensing point difference (L) of 50 μm, the chromatic aberration lens 720c is set to have a condensing point difference (L) of 100 μm, the chromatic aberration lens 720d is set to have a condensing point difference (L) of 150 μm, and the chromatic aberration lens 720e is set to have a condensing point difference (L) of 200 μm. Incidentally, the chromatic aberration lenses 720a, 720b, 720c, 720d, 720e are all configured so that the condensing point position P3 of the detection laser beam LB2 (635 nm) is located on the upstream side in the laser beam radiating direction in relation to the condensing point position P of the machining pulsed laser beam LB1 (wavelength: 1064 nm).

The plurality of chromatic aberration lenses 720a, 720b, 720c, 720d, 720e configured as above are arranged in a circular lens case 74 along the circumferential direction with the same radius. In addition, a rotary shaft 741 is provided at the center of the circular lens case 74, and the rotary shaft 741 is rotated by a pulse motor 75, as required. Therefore, with the circular lens case 74 rotated by the pulse motor 75, a predetermined chromatic aberration lens 720 can be positioned onto the optical axis of the machining pulsed laser beam LB1 and the detection laser beam LB2. Accordingly, the circular lens case 74 with the plurality of chromatic aberration lenses 720a, 720b, 720c, 720d, 720e contained therein and the pulse motor 75 function as lens positioning means for positioning each of the plurality of chromatic aberration lenses 720 onto the optical axis of the machining pulsed laser beam LB1 and the detection laser beam LB2.

The circular lens case 74 with the plurality of chromatic aberration lenses 720a, 720b, 720c, 720d, 720e contained therein and the pulse motor 75 are contained in a case 7, which is moved in a direction (in FIG. 13, the vertical direction) perpendicular to the holding surface (upper surface) of the chuck table 36 by an actuator 740 composed of a piezo motor which constitutes second condensing point position adjusting means.

The present invention is not limited to the details of the above described preferred embodiments. The scope of the invention is defined by the appended claims and all changes and modifications as fall within the equivalents of the scope of the claims are therefore to be embraced by the invention.

What is claimed is:

1. A laser beam machining apparatus comprising:
a chuck table having a workpiece holding surface for holding a workpiece to be machined;
machining laser beam oscillating means for oscillating a machining pulsed laser beam for machining said workpiece held on said chuck table;
a condenser for condensing said machining pulsed laser beam oscillated by said machining laser beam oscillating means, wherein said condenser includes a condenser lens and an actuator for moving said condenser lens in a direction perpendicular to the workpiece holding surface;
condensing point position adjusting means for displacing a condensing point position of said machining pulsed laser beam condensed by said condenser;
height position detecting means for detecting the height position of an upper surface of said workpiece held on said chuck table, said height position detecting means including detection laser beam oscillating means for oscillating a laser beam different in wavelength from said machining pulsed laser beam, a detection laser beam irradiation path for guiding said detection laser beam oscillated by said detection laser beam oscillating means to said condenser, a detection laser beam reflection path for guiding a reflected beam generated upon reflection by said workpiece held on said chuck table of a laser beam radiated through said detection laser beam irradiation path and said condenser, reflected beam analyzing means which is disposed in said detection laser beam reflection path so as to analyze said reflected beam reflected on said upper surface of said workpiece, and condensing point position displacing means for displacing the condensing point position of said detection laser beam and the condensing point position of said machining pulsed laser beam;
control means for controlling said actuator of said condenser and said condensing point position adjusting means on the basis of a detection signal from said height position detecting means; and
feeding means for continually feeding said workpiece relative to said condenser while irradiating both the detection laser beam and the machining pulsed laser beam simultaneously onto said workpiece thereby forming a denatured layer at an even, predetermined position of depth from the upper surface of said workpiece by allowing movement of said condenser up and down corresponding to a ruggedness of said workpiece to thereby keep a distance from said condenser to the upper surface of said workpiece constant.

2. The laser beam machining apparatus according to claim 1, wherein said condensing point position displacing means includes a pair of convex lenses, and spacing adjusting means for adjusting the spacing between said pair of convex lenses, and is disposed in either one of said irradiation path of said detection laser beam and an irradiation path of said machining pulsed laser beam.

3. The laser beam machining apparatus according to claim 2, wherein said condensing point position displacing means is disposed in said irradiation path of said detection laser beam.

4. The laser beam machining apparatus according to claim 1, wherein said condenser lens includes a plurality of chromatic aberration lenses for modifying said condensing point position of said machining pulsed laser beam and the condensing point position of said detection laser beam, and the condensing point position displacing means includes lens positioning means for positioning each of the plurality of chromatic aberration lenses on an optical path of the machining pulsed laser beam and an optical path of the detection laser beam.

5. The laser beam machining apparatus according to claim 1, wherein said machining laser beam oscillating means oscillates a machining pulsed laser beam which has such a wavelength as to be transmitted through said workpiece to be machined, and said detection laser beam oscillating means oscillates a detection laser beam which has such a wavelength as to be reflected by said workpiece.

6. A method of machining a workpiece using a laser beam machining apparatus, wherein the apparatus includes a chuck table having a workpiece holding surface for holding the workpiece to be machined, the method comprising;
oscillating, with a machining laser beam oscillating means, a machining pulsed laser beam upon the workpiece held on the chuck table;
condensing, with a condenser, the machining pulsed laser beam oscillated by the machining laser beam oscillating means;
displacing, with a condensing point position adjusting means, a condensing point position of the machining pulsed laser beam condensed by the condenser;
detecting, using a height position detecting means, the height position of an upper surface of the workpiece held on the chuck table,
wherein the step of detecting height position includes:
oscillating, with a detection laser beam oscillating means, a laser beam different in wavelength from the machining pulsed laser beam,
guiding the detection laser beam oscillated by the detection laser beam oscillating means to the condenser along a detection laser beam irradiation path,
guiding, along a detection laser beam reflection path, a reflected beam generated upon reflection by the workpiece held on the chuck table of a laser beam radiated through the detection laser beam irradiation path and the condenser,
using a reflected beam analyzing means, which is disposed in the detection laser beam reflection path, to analyze the reflected beam reflected on the upper surface of the workpiece, and
displacing, with a condensing point position displacing means, the condensing point position of the detection laser beam and the condensing point position of the machining pulsed laser beam;
controlling, using a control means, the condensing point position adjusting means on the basis of a detection signal from the height position detecting means; and
continually feeding, using a feeding means, the workpiece relative to the condenser while irradiating both the detection laser beam and the machining pulsed laser beam simultaneously onto the workpiece, thereby forming a denatured layer at an even, predetermined position of depth from the upper surface of the workpiece by allowing movement of the condenser up and down corresponding to a ruggedness of the workpiece to thereby keep a distance from the condenser to the upper surface of the workpiece constant.

7. The method according to claim 6, wherein the machining laser beam oscillating means oscillates a machining pulsed laser beam which has such a wavelength as to be transmitted through the workpiece to be machined, and the detection laser beam oscillating means oscillates a detection laser beam which has such a wavelength as to be reflected by the workpiece.

8. A method for using a laser beam machining apparatus, wherein the apparatus includes a chuck table having a workpiece holding surface for holding the workpiece to be machined, the method comprising:
- oscillating, with a machining laser beam oscillating means, a machining pulsed laser beam for machining the workpiece held on the chuck table;
- condensing, with a condenser, the machining pulsed laser beam oscillated by the machining laser beam oscillating means;
- displacing, with a condensing point position adjusting means, a condensing point position of the machining pulsed laser beam condensed by the condenser;
- detecting the height position of an upper surface of the workpiece held on the chuck table using a height position detecting means; and
- controlling, with a control means, the condensing point position adjusting means on the basis of a detection signal from the height position detecting means, wherein the step of detecting the height position includes:
- oscillating, with a detection laser beam oscillating means, a detection laser beam that is different in wavelength from the machining pulsed laser beam,
- guiding the detection laser beam oscillated by the detection laser beam oscillating means to the condenser along a detection laser beam irradiation path,
- guiding, along a detection laser beam reflection path, a reflected beam generated upon reflection by the workpiece held on the chuck table of a laser beam radiated through the detection laser beam irradiation path and the condenser,
- using a reflected beam analyzing means, which is disposed in the detection laser beam reflection path, to analyze the reflected beam reflected from the upper surface of the workpiece and to send an analytical result to the control means, and
- displacing, with a condensing point position displacing means, the condensing point position of the detection laser beam and the condensing point position of the machining pulsed laser beam, wherein the step of oscillating the machining pulsed laser beam and the step of oscillating the detection laser beam are performed simultaneously so that both the detection laser beam and the and the machining pulsed layer beam are irradiated simultaneously onto the workpiece.

9. The method according to claim 8, wherein said machining laser beam oscillating means oscillates a machining pulsed laser beam which has such a wavelength as to be transmitted through said workpiece to be machined, and said detection laser beam oscillating means oscillates a detection laser beam which has such a wavelength as to be reflected by said workpiece.

* * * * *